(12) United States Patent
Tirkkonen et al.

(10) Patent No.: US 7,526,708 B2
(45) Date of Patent: Apr. 28, 2009

(54) ADAPTIVE RETRANSMISSION FOR FREQUENCY SPREADING

(75) Inventors: Olav Tirkkonen, Helsinki (FI); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 520 days.

(21) Appl. No.: 11/028,950

(22) Filed: Jan. 3, 2005

(65) Prior Publication Data
US 2006/0179390 A1    Aug. 10, 2006

(51) Int. Cl.
*H04L 1/18* (2006.01)
(52) U.S. Cl. ....................................... 714/751
(58) Field of Classification Search .............. 714/748, 714/751
See application file for complete search history.

(56) References Cited

U.S. PATENT DOCUMENTS

| | | | |
|---|---|---|---|
| 2002/0106989 A1* | 8/2002 | Aizawa et al. | 455/67.1 |
| 2003/0039229 A1 | 2/2003 | Ostman | |
| 2005/0128993 A1* | 6/2005 | Yu et al. | 370/342 |
| 2006/0018258 A1* | 1/2006 | Teague et al. | 370/236 |

FOREIGN PATENT DOCUMENTS

WO    WO 03/101029    12/2003

OTHER PUBLICATIONS

K. Miyoshi et al., "Constellation Rearrangement and Spreading Code Rearrangement for Hybrid ARQ in MC-CDMA," *IEEE* 2002, pp. 668-672.
H. Atarashi et al., "Broadband Packet Wireless Access Based On VSF-OFDM and MC/DS-CDMA," *IEEE* 2002, PIMRC 2002.
K. Ming et al., "Hybrid OFDM-CDMA: A Comparison of MC/DS-CDMA, MC-CDMA and OFCDM," T. Chee: *Hybrid OFDM-CDMA* Sep. 19, 2002.
N. Miki et al., "Evaluation of Throughput Employing Hybrid ARQ Packet Combining In Forward Link OFCDM Broadband Wireless Access," *IEEE* 2002, PIMRC 2002.
B. J. Wysocki et al., "Modified Walsh-Hadamard Sequences for DS CDMA Wireless Systems."
S. Nobilet et al., "Spreading Sequences Selection for Uplink and Downlink MC-CDMA Systems."
S. Abeta et al., "Broadband Packet Wireless Access Incorporating High-Speed IP Packet Transmission."
N. Yee et al., "Multi-Carrier CDMA In Indoor Wireless Radio Networks."
Miki, N. et al. "Effect of time diversity in hybrid ARQ considering space and path diversity for VSF-OFCDM downlink broadband wireless access"; 15th IEEE International Symposium on Personal, Indoor and Mobile Radio Communications, 2004. PIMRC 2004; Sep. 5-8, 2004, vol. 1, pp. 604-608, INSPEC AN: 8133568, see sections I-II.

(Continued)

*Primary Examiner*—Esaw T Abraham

(57) ABSTRACT

A method and corresponding wireless communication equipment, for use for example in connection with automatic retransmission request protocols for orthogonal frequency and code division multiplexing (OFCDM) wireless communication, the method including: a step in which the wireless communication equipment communicates an original transmission of a signal including two symbol streams each conveyed by at least two subcarriers of a single wideband carrier, where each symbol stream is conveyed by each of the at least two subcarriers after multiplication by a respective factor, the factors associated with each symbol stream forming a multicode for the symbol stream and the respective multicodes for the two symbol streams being mutually orthogonal; and a step in which the wireless communication equipment retransmits the signal, with the retransmission such that one factor is reversed in sign for each subcarrier.

16 Claims, 1 Drawing Sheet

OTHER PUBLICATIONS

Harada, A. et al: "Investigations on BLER requirements of associated control channels for IP packet transmission in forward link for VSF-OFCDM broadband packet wireless access"; 2004 IEEE 60th Vehicular Technlogy Confrence, 2004. VTC2004-fall. Sep. 26-29, 2004, vol. 5, pp. 3310-3314, Inspec an: 8456075, see abstract.

* cited by examiner

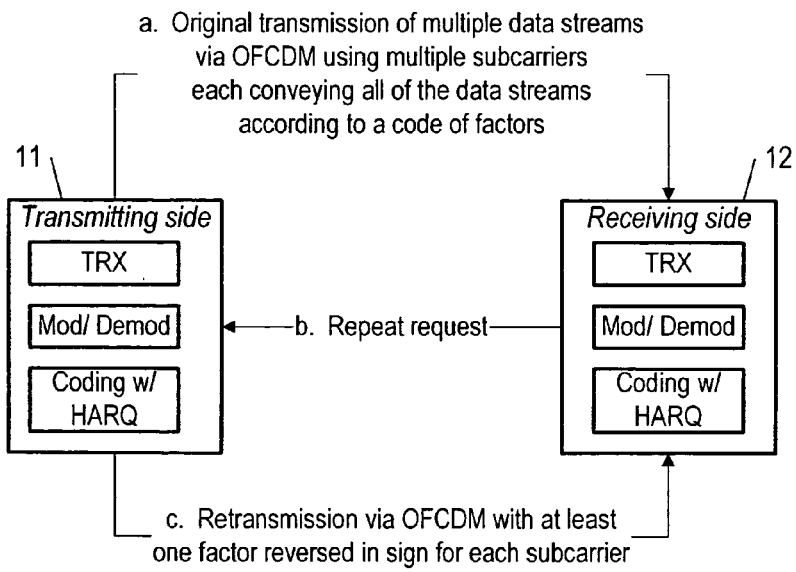
Fig. 1
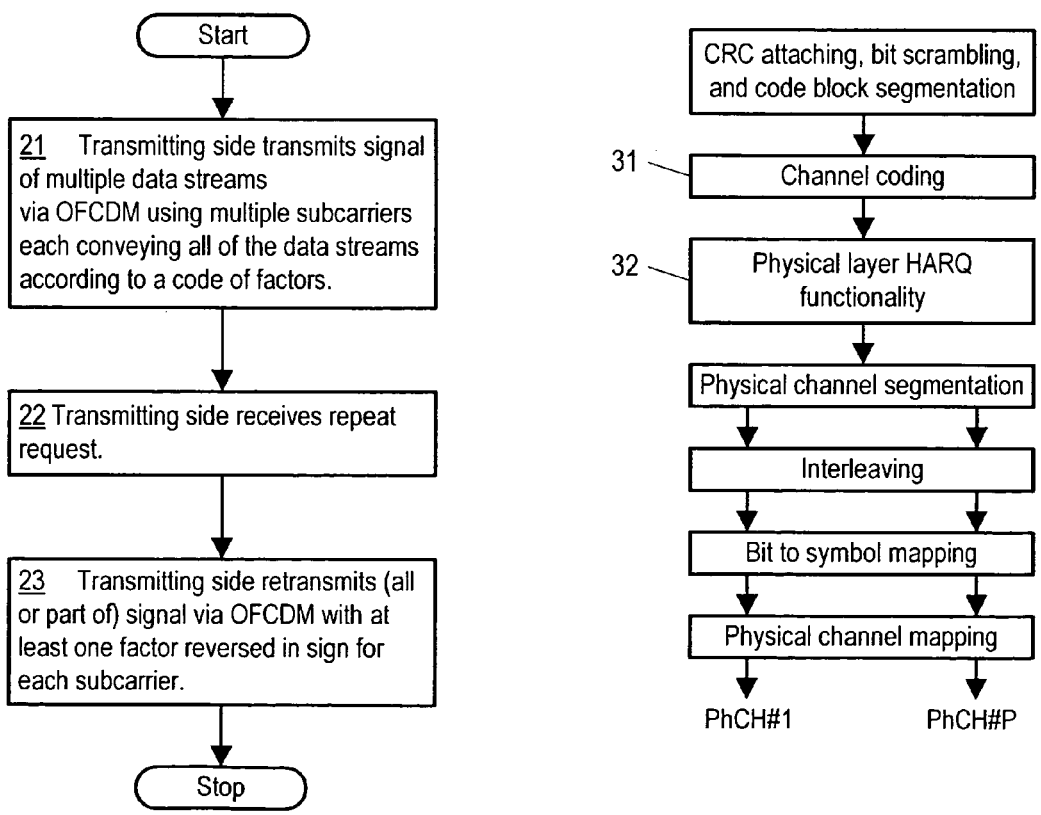
FIG. 2
FIG. 3

ADAPTIVE RETRANSMISSION FOR FREQUENCY SPREADING

BACKGROUND OF THE INVENTION

1. Technical Field

The present invention pertains to the field of cellular communication. More particularly, the present invention pertains to wireless communication of data as opposed to voice communication.

2. Discussion of Related Art

The invention concerns automatic retransmission request (ARQ) protocols for orthogonal frequency and code division multiplexing (OFCDM). The invention is a generalization of the so-called space-time adaptive retransmission (STAR) method, described e.g. in "Matrix modulation and adaptive retransmission," by A. Hottinen and O. Tirkkonen, in Proc. IEEE ISSPA, July 2003, vol. 1, pp. 221-224. Accordingly, the invention is sometimes called Adaptive Retransmission for Frequency Spreading (ARFS).

An OFCDM signal model is as follows, in terms of baseband signals after FFT, assuming that the delay spread is smaller than the cyclic prefix, so that individual subcarriers experience frequency flat fading. Let us assume Walsh-Hadamard (WH) spreading with spreading factor S. This means that each symbol is spread over S subcarriers. Advantageously the subcarriers are interleaved, so that no subcarriers conveying a symbol are neighbors. Preferably, in the interleaving all groups of subcarriers belonging to the same spreading code are such that the distance (in frequency) between the subcarriers is as large as possible, and at a minimum, larger than a typical coherence bandwidth. Then the subcarriers over which a symbol are spread are likely to have uncorrelated or only weakly correlated channels. Also, we make the crucial assumption that in a downlink transmission at least some multicodes are transmitted to a single user. In an uplink transmission this reduces to requiring that multicode transmission is used on at least some of the spread subcarriers. In the HS-PDSCH (high speed-physical downlink shared channel), the capacity is shared primarily by time-division, but it is also possible to code multiplex a few terminals (one to four) during the TTI. The channelization codes are allocated at a fixed spreading factor (16), but the base station may assign multiple channelization codes for one terminal during a TTI thus applying multicode transmission.

Preferably, WH-spreading codes are not used to separate users. Users may be separated in time or frequency. Because of separating a user preferably not by use of a spreading code, but instead by use of time or frequency separation, the term OFCDM is used here, instead of multi-carrier CDMA (MC-CDMA). (Typically MC-CDMA is also understood as a code-division method to separate users. Here we want to stress the "multi-code" aspect of MC-CDMA, and consider the situation where many codes in overlapping dimensions are allocated to the same user. That is why we use the terminology OFCDMA instead of MC-CDMA. There is though no reason not to use the term MC-CDMA as descriptive in the case that the spreading factor is smaller than the number of subcarriers, and preferably multicodes are allocated to users from the set of codes spreading over the same subcarriers.)

For a single transmit antenna at the transmitter and a single receive antenna at the receiver, the signal model would be $$y = HCx + n = \mathcal{H}x + \text{noise} \qquad (1)$$

where y is an S×1 vector of received signals on the S subcarriers, H is an S×S diagonal matrix with the $k^{th}$ diagonal element representing the channel received on the $k^{th}$ subcarrier covered by the spreading code, C is an S×S spreading code matrix, each column being one spreading code, x is an S×1 vector of data transmitted on each spreading code, $\mathcal{H}$ is an S×S equivalent channel matrix, and n is additive noise.

Take for example the case of WH spreading using a spreading factor S=2. The signal model in this case can be written explicitly as:

$$\begin{bmatrix} y_1 \\ y_2 \end{bmatrix} = \frac{1}{\sqrt{2}} \begin{bmatrix} h_1 & 0 \\ 0 & h_2 \end{bmatrix} \begin{bmatrix} 1 & 1 \\ 1 & -1 \end{bmatrix} \begin{bmatrix} x_1 \\ x_2 \end{bmatrix} + n = \frac{1}{\sqrt{2}} \begin{bmatrix} h_1 & 0 \\ 0 & h_2 \end{bmatrix} \begin{bmatrix} x_1 + x_2 \\ x_1 - x_2 \end{bmatrix} + n$$

$$= \frac{1}{\sqrt{2}} \begin{bmatrix} h_1 & h_1 \\ h_2 & -h_2 \end{bmatrix} \begin{bmatrix} x_1 \\ x_2 \end{bmatrix} + n,$$

where $h_s$ is the channel on subcarrier s and represents the power of the subcarrier s, the WH spreading codes are normalized by the factor $1/\sqrt{2}$, and the matrix $$C = \begin{bmatrix} 1 & 1 \\ 1 & -1 \end{bmatrix}$$

is the spreading code matrix and is made up of the two spreading codes (columns of the matrix)

$$\begin{bmatrix} 1 \\ 1 \end{bmatrix}$$

and $$\begin{bmatrix} 1 \\ -1 \end{bmatrix}.$$

Thus, $$\mathcal{H} = \frac{1}{\sqrt{2}} \begin{bmatrix} h_1 & h_1 \\ h_2 & -h_2 \end{bmatrix}$$

is the equivalent channel matrix for S=2.

It is straight forward to see that despite the spreading codes being orthogonal at transmission, the received signal is not orthogonal. The correlation matrix R of the transmitted signal is the so-called Gram matrix of the equivalent channel, i.e.

$$R = \mathcal{H}^{\dagger}\mathcal{H} = \frac{1}{2}\begin{bmatrix} |h_1|^2 + |h_2|^2 & |h_1|^2 - |h_2|^2 \\ |h_1|^2 - |h_2|^2 & |h_1|^2 + |h_2|^2 \end{bmatrix} = \frac{1}{2}\begin{bmatrix} a & b_{pm} \\ b_{pm} & a \end{bmatrix}$$

where a is the total power of the subcarriers, i.e.

$$a = \sum_{s=1}^{S} |h_2|^2$$

and $b_{pm}$ is the interference between the code channels, given by:

$$b_{pm} = |h_1|^2 - |h_2|^2.$$

The interference vanishes and the received signal is orthogonal only if $|h_1|^2 = |h_2|^2$, which would occur for frequency flat fading.

The simplest receiver is a matched filter receiver, indicated by $\mathcal{H}^\dagger$ yielding output:

$$z = \mathcal{H}^\dagger y.$$

Written in terms of the transmitted signal and noise, the matched filter output is $$z = Rx + \mathcal{H}^\dagger n.$$

If the matched filter is judged to be a sufficient receiver, symbol estimates are directly constructed from $z = \mathcal{H}^\dagger y$. More reliable estimates may be constructed by attempting to invert the dependence of the correlation matrix in $z = Rx + \mathcal{H}^\dagger n$. Thus e.g. a zero-forcing (de-correlating) receiver applies the pseudo-inverse on the received signal, $$\hat{x} = R^{-1}\mathcal{H}^\dagger y = x + R^{-1}\mathcal{H}^\dagger n.$$

The resulting symbol estimates are corrupted by colored noise. A Linear Minimum Mean Square Error estimate (LMMSE) is constructed using the pseudo-inverse with a noise estimate added to R in the inverse. (The effects of the colored noise can be mitigated by applying even more complicated detectors of the M-algorithm type, preferably based on a so-called QR-decomposition.)

In conventional ARQ, the retransmissions are exactly similar to the first transmission. If hard decision demodulation is used, the matched filtering is performed exactly as for the first transmission. After that, the matched filter outputs are summed, as well as the correlation matrices (or pseudo inverses), and the de-correlating, LMMSE or non-linear demodulation algorithm is used. For S=2, the correlation matrix for a second transmission according to conventional ARQ is:

$$\tilde{R} = \frac{1}{2}\begin{bmatrix} \tilde{a} & \tilde{b}_{pm} \\ \tilde{b}_{pm} & \tilde{a} \end{bmatrix}$$

where $\tilde{a}$ and $\tilde{b}_{pm}$ are the total channel power and correlation coefficients, with $h_s$ replaced by the channel $\tilde{h}_s$ during the retransmission. The sum of the original matched filter output and the matched filter output for the retransmission is:

$$z + \tilde{z} = (R+\tilde{R})x + \mathcal{H}^\dagger n + \tilde{\mathcal{H}}^\dagger \tilde{n}$$

where the sum of the correlation matrices is:

$$R + \tilde{R} = \frac{1}{2}\begin{bmatrix} a + \tilde{a} & b_{pm} + \tilde{b}_{pm} \\ b_{pm} + \tilde{b}_{pm} & a + \tilde{a} \end{bmatrix},$$

which shows the diversity advantage if the retransmission is outside the channel coherence time. The channel powers add coherently, whereas the self-interference terms add non-coherently (as real numbers). Thus the expected relative self-interference after a retransmission is smaller than before. If, however, the retransmission is within the channel coherence time, the sum correlation is just twice that for R Both channel power and self-interference add coherently. The only gain from the retransmission is that noise combines non-coherently, so the signal to interference and noise ratio (SINR) is improved.

Thus, with conventional ARQ, the complexity of detecting two transmissions is exactly twice the complexity of receiving one transmission, plus the complexity of summing the two matched filter outputs and correlation matrices/pseudo inverses. For soft output demodulation, the procedure described above may be followed with a step of combining the transmissions. Alternatively, soft outputs may be constructed from the first and second transmission separately, and the likelihood ratios may be added. The overall complexity is approximately the same.

What is needed is needed is a way to perform retransmission without adding appreciably to the complexity of the receiver processing.

DISCLOSURE OF INVENTION

Accordingly, in a first aspect of the invention, a method is comprising: a step in which a radio transmitter communicates via wireless communication an original transmission of a signal including two symbol streams each conveyed by at least two subcarriers of a single wideband carrier, wherein each symbol stream is conveyed by each of the at least two subcarriers after multiplication by a respective factor, the factors associated with each symbol stream forming a multicode for the symbol stream and the respective multicodes for the two symbol streams being mutually orthogonal; and a step in which the radio transmitter retransmits the signal; wherein in the retransmission one factor is reversed in sign for each subcarrier.

In a second aspect of the invention, a computer program product is provided comprising a computer readable storage structure embodying computer program code thereon for execution by a computer processor, wherein said computer program code comprises instructions for performing a method according to the first aspect of the invention.

In a third aspect of the invention, a device component is provided, comprising: means for preparing for wireless communication an original transmission of a signal including two symbol streams each conveyed by at least two subcarriers of a single wideband carrier, wherein each symbol stream is conveyed by each of the at least two subcarriers after multiplication by a respective factor, the factors associated with each symbol stream forming a multicode for the symbol stream and the respective multicodes for the two symbol streams being mutually orthogonal; and means for responding to a retransmission request by preparing all or part of the original transmission for retransmission, wherein in the retransmission one factor is reversed in sign for each subcarrier.

In a fourth aspect of the invention, a device is provided, comprising: a device component as in the third aspect of the invention, for providing a coded signal for wireless communication; and means for transmitting the coded signal and for receiving any retransmission request in respect to the coded signal.

In a fifth aspect of the invention, a system is provided, comprising: a transmitter device as in the fourth aspect of the invention, for providing the original transmission of the signal, for responding to a request to retransmit the signal, and for retransmitting the signal; and a receiver device, responsive to the original transmission, for providing the request to retransmit the signal, and responsive to the retransmitted signal.

In accord with the above aspects of the invention, in the retransmission for one of the symbol streams all factors may be reversed in sign and for the other of the symbol streams no factors may then be reversed in sign.

Also in accord with the above aspects of the invention, among the retransmitted symbols there may be a pair of symbols for which one factor is reversed in sign for each subcarrier.

Also in accord with the above aspects of the invention, in case of retransmitting an even number 2M of symbol streams sharing a plurality N of subcarriers where N is at least 2M, a number M of factors on each subcarrier may be reversed in sign.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram/flow diagram showing a transmitting side telecommunications device and a receiving side telecommunications device with the transmitting side providing a transmission and then a retransmission according to the invention.

FIG. 2 is a flow chart of a method according to the invention, by which the transmitting side of FIG. 1 provides a retransmission.

FIG. 3 is a block diagram of a coding chain of a type including a module in which the invention can be implemented.

BEST MODE FOR CARRYING OUT THE INVENTION

The invention is described here in case of wireless communication of multiple data streams via OFCDM, using a plurality of subcarriers, each conveying each of the data streams, but doing so according to a code by which the data streams on the set of subcarriers are mutually orthogonal. It should be understood however, that the invention is of communication by other than OFCDM; the invention is of use in case of any communication using a set of subcarriers to convey a plurality of data streams.

According to one embodiment of the invention, if a transmission block is in error, and a NACK (negative acknowledgment) is returned to the transmitter, the transmitter may select at least part of the spread multi-carrier symbol to be retransmitted. If the selected part is from a multi-code transmission, the sign of half of the spreading codes is changed.

Thus, for a spreading factor of S=2, the sign of the second spreading code (or equivalently, the sign of the second symbol) is changed for the retransmission. The received signal thus becomes:

$$\tilde{y} = \frac{1}{\sqrt{2}} \begin{bmatrix} \tilde{h}_1 & 0 \\ 0 & \tilde{h}_2 \end{bmatrix} \begin{bmatrix} 1 & -1 \\ 1 & 1 \end{bmatrix} \begin{bmatrix} x_1 \\ x_2 \end{bmatrix} + \tilde{n}$$

showing the spreading codes (second matrix) explicitly. This can be rewritten as:

$$\tilde{y} = \frac{1}{\sqrt{2}} \begin{bmatrix} \tilde{h}_1 & -\tilde{h}_1 \\ \tilde{h}_2 & \tilde{h}_2 \end{bmatrix} \begin{bmatrix} x_1 \\ x_2 \end{bmatrix} + n \equiv \tilde{\mathcal{H}} x + n = \frac{1}{2} \begin{bmatrix} \tilde{h}_1(x_1 - x_2) \\ \tilde{h}_2(x_1 + x_2) \end{bmatrix} + n$$

where $\tilde{h}_s$ is the channel (response) for subcarrier s during the retransmission. The matched filter output is given by $$\tilde{z} = \tilde{\mathcal{H}}^\dagger \tilde{y} \equiv \tilde{R} x + \tilde{\mathcal{H}}^\dagger \tilde{n}$$

in which the correlation matrix $\tilde{R}$ is given by $$\tilde{R} = \frac{1}{2} \begin{bmatrix} \tilde{a} & -\tilde{b}_{pm} \\ -\tilde{b}_{pm} & \tilde{a} \end{bmatrix}.$$

Note that the off-diagonal terms, which determine the interference between the two symbols, have changed sign as compared to the correlation matrix for the original transmission, which, as described above, is given by $$R = \mathcal{H}^\dagger \mathcal{H} = \frac{1}{2} \begin{bmatrix} |h_1|^2 + |h_2|^2 & |h_1|^2 - |h_2|^2 \\ |h_1|^2 - |h_2|^2 & |h_1|^2 + |h_2|^2 \end{bmatrix} = \frac{1}{2} \begin{bmatrix} a & b_{pm} \\ b_{pm} & a \end{bmatrix}.$$

Thus, in summing the original matched filter output and the matched filter output for the retransmission to estimate the transmitted symbols x (as described above) according to, $$z + \tilde{z} = (R + \tilde{R}) x + \mathcal{H}^\dagger n + \tilde{\mathcal{H}}^\dagger \tilde{n}, \qquad (2)$$

the included sum of the respective correlation matrices becomes, $$R + \tilde{R} = \frac{1}{2} \begin{bmatrix} a + \tilde{a} & b_{pm} - \tilde{b}_{pm} \\ b_{pm} - \tilde{b}_{pm} & a + \tilde{a} \end{bmatrix}.$$

If the retransmission is received outside of the so-called channel coherence time—i.e. if the retransmission arrives at the receiver after the channel changes appreciably (e.g. because either the transmitter or receiver has moved to a place where reception is more difficult)—the resulting correlation is similar to the correlation after a retransmission in the conventional ARQ protocol, i.e. it is uncorrelated. When the two transmissions/fading realizations are uncorrelated, the off-diagonal components $b_{pm}$ and $-\tilde{b}_{pm}$ are correspondingly completely uncorrelated, and so sum noncoherently, i.e. instead of the amplitudes $b_{pm}$ and $-\tilde{b}_{pm}$ summing, the corresponding powers sum. But in case the retransmission is received within the correlation time, the amplitudes sum, i.e. the method of the invention differs from the conventional method comes if the channels of the original transmission and the retransmission are correlated, i.e. are substantially the same. In particular, if the retransmission occurs within the channel coherence time (so that $b_{pm}$ and $-\tilde{b}_{pm}$ cancel each other), the interference between (x1,x2) is completely destroyed, and so $$R + \tilde{R}\big|_{h=\tilde{h}} = \begin{bmatrix} a & 0 \\ 0 & a \end{bmatrix}.$$

Thus if the retransmission arrives within the channel coherence time, when using retransmission according to the invention the interference terms add destructively whereas the total channel power a adds coherently. After summing the matched filter outputs z and $\tilde{z}$ as in eq. (2), the transmitted symbols x may either be directly detected, or the combined correlation matrix $R+\tilde{R}$ may be inverted using zero-forcing or LMMSE, or e.g. an M-algorithm. Irrespective of the detection method or whether hard/soft decision is used, the complexity of detecting two transmissions is exactly twice the complexity of detecting the first transmission, plus the negligible additional complexity arising from summing the two matched filter outputs. If the retransmission is well within the channel coherence time, receivers for retransmissions (apart from the matched filter) may be simplified.

For S=4, the first transmission is:

$$\tilde{y} = \frac{1}{2}\begin{bmatrix} \tilde{h}_1 & & & \\ & \tilde{h}_2 & & \\ & & \tilde{h}_3 & \\ & & & \tilde{h}_4 \end{bmatrix}\begin{bmatrix} 1 & 1 & -1 & -1 \\ 1 & -1 & -1 & 1 \\ 1 & 1 & 1 & 1 \\ 1 & -1 & 1 & -1 \end{bmatrix}\begin{bmatrix} x_1 \\ x_2 \\ x_3 \\ x_4 \end{bmatrix} + n$$

$$= \frac{1}{2}\begin{bmatrix} \tilde{h}_1 & \tilde{h}_1 & -\tilde{h}_1 & -\tilde{h}_1 \\ \tilde{h}_2 & -\tilde{h}_2 & -\tilde{h}_2 & \tilde{h}_2 \\ \tilde{h}_3 & \tilde{h}_3 & \tilde{h}_3 & \tilde{h}_3 \\ \tilde{h}_4 & -\tilde{h}_4 & \tilde{h}_4 & -\tilde{h}_4 \end{bmatrix}\begin{bmatrix} x_1 \\ x_2 \\ x_3 \\ x_4 \end{bmatrix} + n \equiv \tilde{\mathcal{H}}x + n.$$

For the first retransmission the sign of half of the codes (or equivalently, the sign of half of the symbols) are changed. Changing the two last ones, the received retransmitted signal becomes, $$\tilde{y} = \frac{1}{2}\begin{bmatrix} \tilde{h}_1 & & & \\ & \tilde{h}_2 & & \\ & & \tilde{h}_3 & \\ & & & \tilde{h}_4 \end{bmatrix}\begin{bmatrix} 1 & 1 & -1 & -1 \\ 1 & -1 & -1 & 1 \\ 1 & 1 & 1 & 1 \\ 1 & -1 & 1 & -1 \end{bmatrix}\begin{bmatrix} x_1 \\ x_2 \\ x_3 \\ x_4 \end{bmatrix} + n$$

showing the spreading codes explicitly (second matrix on the right-hand side). This can be rewritten as $$\tilde{y} = \frac{1}{2}\begin{bmatrix} \tilde{h}_1 & \tilde{h}_1 & -\tilde{h}_1 & -\tilde{h}_1 \\ \tilde{h}_2 & -\tilde{h}_2 & -\tilde{h}_2 & \tilde{h}_2 \\ \tilde{h}_3 & \tilde{h}_3 & \tilde{h}_3 & \tilde{h}_3 \\ \tilde{h}_4 & -\tilde{h}_4 & \tilde{h}_4 & -\tilde{h}_4 \end{bmatrix}\begin{bmatrix} x_1 \\ x_2 \\ x_3 \\ x_4 \end{bmatrix} + n \equiv \tilde{\mathcal{H}}x + n$$

and the corresponding correlation matrix is $$\tilde{R} = \frac{1}{4}\begin{bmatrix} \bar{a} & \bar{b}_{pmpm} & -\bar{b}_{ppmn} & -\bar{b}_{pmnp} \\ \bar{b}_{pmpm} & \bar{a} & -\bar{b}_{pmnp} & -\bar{b}_{ppmn} \\ -\bar{b}_{ppmn} & -\bar{b}_{pmnp} & \bar{a} & \bar{b}_{pmpm} \\ -\bar{b}_{pmnp} & -\bar{b}_{ppmn} & \bar{b}_{pmpm} & \bar{a} \end{bmatrix}.$$

Note that the correlations between the pairs (x1,x2) and (x3, x4) have changed sign. In the sum of the original matched filter output and the matched filter output for the retransmission, the sum of the two correlation matrices becomes $$R + \tilde{R} =$$

$$\frac{1}{4}\begin{bmatrix} a+\bar{a} & b_{pmpm}+\bar{b}_{pmpm} & b_{ppmn}-\bar{b}_{ppmn} & b_{pmnp}-\bar{b}_{pmnp} \\ b_{pmpm}+\bar{b}_{pmpm} & a+\bar{a} & b_{pmnp}-\bar{b}_{pmnp} & b_{ppmn}-\bar{b}_{ppmn} \\ b_{ppmn}-\bar{b}_{ppmn} & b_{pmnp}-\bar{b}_{pmnp} & a+\bar{a} & b_{pmpm}+\bar{b}_{pmpm} \\ b_{pmnp}-\bar{b}_{pmnp} & b_{ppmn}-\bar{b}_{ppmn} & b_{pmpm}+\bar{b}_{pmpm} & a+\bar{a} \end{bmatrix}$$

and the symbols after retransmission may be directly estimated using the above sum in eq. (2).

Again, though, if the retransmission comes outside of the channel coherence time, the resulting correlation is similar as for the conventional ARQ protocol, and the difference becomes visible in correlated channels. If, however, the retransmission occurs within the channel coherence time, the interference between (x1,x2) and (x3,x4) is completely destroyed, so that, $$R + \tilde{R}\big|_{h=\tilde{h}} = \frac{1}{2}\begin{bmatrix} a & b_{pmpm} & 0 & 0 \\ b_{pmpm} & a & 0 & 0 \\ 0 & 0 & a & b_{pmpm} \\ 0 & 0 & b_{pmpm} & a \end{bmatrix}. \quad (3)$$

The total channel power a and the interference between x1 and x2, as well as the interference between x3 and x4 add coherently.

Now if the retransmission is well within the channel coherence time, receivers for retransmissions (apart from the matched filter) may be considerably simplified. This is a natural consequence of increasing orthogonality of the system after retransmissions. After one retransmission, the correlation matrix to be inverted, i.e. the matrix (sum of correlation matrices) given by eq. (3) becomes simpler. It consists of two 2×2 matrix blocks on the block diagonal. These may be inverted separately, so the receiver problem becomes in effect one of inverting two 2×2 matrices, which is much simpler than inverting a 4×4 matrix. Similarly, possible tree-search algorithms are considerably simplified due to much-reduced error propagation.

A possible third transmission (second retransmission) can be provided having correlation $\hat{R}$, where for the third transmission, compared to the first transmission, the sign of the second and third symbol (or, equivalently, that of the spreading code) can be changed. After the third transmission, if it is within the channel coherence time, the sum of the correlation matrices is, $$R + \tilde{R} + \hat{R}\big|_{h=\tilde{h}=\hat{h}} = \frac{1}{4}\begin{bmatrix} 3a & b_{pmpm} & -b_{ppmm} & b_{pmmp} \\ b_{pmpm} & 3a & b_{pmmp} & -b_{ppmm} \\ -b_{ppmm} & b_{pmmp} & 3a & b_{pmpm} \\ b_{pmmp} & -b_{ppmm} & b_{pmpm} & 3a \end{bmatrix}$$

and includes off-diagonal terms, but they are relatively one-third smaller in magnitude than in conventional ARQ since the diagonal terms add to three times the value for one transmission, but two of the three off-diagonal terms cancel.

Finally, if a fourth transmission is needed, compared to the first transmission, the sign of for example the second and fourth symbol (or that of the spreading code) can be changed. If the original and three retransmissions are all received within the channel coherence time, the sum of the respective correlation matrices is diagonal, with each diagonal term having the value a, i.e. the total channel power for the channel.

The invention encompasses an alternative to the above-described third and fourth transmissions. In the above-described third transmission, the possible detector simplifications after the second transmission, where the sum of the correlation matrices was block diagonal, are lost. Alternative possible third and fourth transmissions may be designed so that the block diagonality remains at all stages. For this, the third and fourth transmissions both apply a lower spreading factor. If the two first transmissions applied S=4, the two following would each apply S=2. Then a possible third transmission (second retransmission) could be arranged so that the symbols x1 and x2 are transmitted on subcarriers 1 and 2, and symbols x3 and x4 on subcarriers 3 and 4, and the sign-shifted WH-spreading is applied on the second spreading codes. The result is $$\hat{y} = \frac{1}{\sqrt{2}}\begin{bmatrix} \hat{h}_1 & 0 & 0 & 0 \\ 0 & \hat{h}_2 & 0 & 0 \\ 0 & 0 & \hat{h}_3 & 0 \\ 0 & 0 & 0 & \hat{h}_4 \end{bmatrix}\begin{bmatrix} 1 & -1 & 0 & 0 \\ 1 & 1 & 0 & 0 \\ 0 & 0 & 1 & -1 \\ 0 & 0 & 1 & 1 \end{bmatrix}\begin{bmatrix} x_1 \\ x_2 \\ x_3 \\ x_4 \end{bmatrix} + n$$

and note that the normalization is now according to S=2. The corresponding correlation matrix is given by, $$\hat{R} = \frac{1}{2}\begin{bmatrix} \hat{a}_{12} & -\hat{b}_{pm00} & 0 & 0 \\ -\hat{b}_{pm00} & \hat{a}_{12} & 0 & 0 \\ 0 & 0 & \hat{a}_{34} & -\hat{b}_{00pm} \\ 0 & 0 & -\hat{b}_{00pm} & \hat{a}_{34} \end{bmatrix}$$

in which $$\hat{a}_{12} = |\hat{h}_1|^2 + |\hat{h}_2|^2$$

$$\hat{a}_{34} = |\hat{h}_3|^2 + |\hat{h}_4|^2$$

$$\hat{b}_{pm00} = |\hat{h}_1|^2 - |\hat{h}_2|^2$$

$$\hat{b}_{00pm} = |\hat{h}_3|^2 - |\hat{h}_4|^2.$$

If the three transmissions are within the channel coherence time, the sum of the three matched filter outputs becomes $$R + \tilde{R} + \hat{R}\big|_{h=\tilde{h}=\hat{h}} = \frac{1}{2}\begin{bmatrix} a + a_{12} & b_{00pm} & 0 & 0 \\ b_{00pm} & a + a_{12} & 0 & 0 \\ 0 & 0 & a + a_{34} & b_{pm00} \\ 0 & 0 & b_{pm00} & a + a_{34} \end{bmatrix}.$$

Thus after the third transmission, the cumulative received signal is almost completely orthogonal (i.e. the sum of the correlation matrices has only small off-diagonal terms), whereas the diversity is not completely balanced, i.e. the two first symbols x1 and x2 in the transmission and retransmission equations are combined so that they have a higher weight from combining of the branches transmitted on the channels of subcarriers 1 and 2 than from combining x3 and x4, i.e. the channels of subcarriers 3 and 4. For the two last symbols, the situation is the opposite. When calculating (36), note that $b_{pmpm} - b_{pm00} = b_{00pm}$. The first and second diagonal elements of the sum correlation matrix, i.e. a $+a_{12}$ and $a+a_{12}$, indicate the channel powers that the symbols x1 and x2 are transmitted over. These two diagonal elements are $a+a_{12}$, where a is the total power of all subcarriers 1, 2, 3, 4, and $a_{12}$ is the sum power of subcarriers 1 and 2. Thus these diagonal elements tell that more power is used to transmit symbols x1 and x2 from subcarriers 1 and 2 (part of a and $a_{12}$) than from subcarriers 3 and 4 (only the part in a).

If a fourth transmission is needed, the symbols-to-subcarriers mapping of the third transmission is changed. The result is $$\bar{y} = \frac{1}{\sqrt{2}}\begin{bmatrix} \hat{h}_1 & 0 & 0 & 0 \\ 0 & \hat{h}_2 & 0 & 0 \\ 0 & 0 & \hat{h}_3 & 0 \\ 0 & 0 & 0 & \hat{h}_4 \end{bmatrix}\begin{bmatrix} 0 & 0 & 1 & -1 \\ 0 & 0 & 1 & 1 \\ 1 & -1 & 0 & 0 \\ 1 & 1 & 0 & 0 \end{bmatrix}\begin{bmatrix} x_1 \\ x_2 \\ x_3 \\ x_4 \end{bmatrix} + n$$

Note that the normalization is now according to S=2. The correlation matrix becomes $$\bar{R} = \frac{1}{2}\begin{bmatrix} \bar{a}_{34} & -\bar{b}_{00pm} & 0 & 0 \\ -\bar{b}_{00pm} & \bar{a}_{34} & 0 & 0 \\ 0 & 0 & \bar{a}_{12} & -\bar{b}_{pm00} \\ 0 & 0 & -\bar{b}_{pm00} & \bar{a}_{12} \end{bmatrix}.$$

If all transmissions are received within the channel coherence time, the off-diagonal terms in the sum correlation matrix all vanish.

Retransmission according to the invention can be used only if more than one of the multicodes are used. In other words, the invention is better suited to cases of multiple access using multicodes where all the multicodes are used by the same user. The invention is therefore, for example, advantageous in case data on at least two multicodes is being retransmitted, and these multicodes share at least two subcarriers. On these two subcarriers, the original transmission could be e.g.: stream x1 transmitted using $[c_1=1, c_2=1]$ and stream x2 using $[c_1=1, c_2=-1]$. Note that here the spreading codes are indicated as row-vectors, as opposed to the signal model above represented by eq. (1), where the spreading codes were indicated as columns of the spreading code matrix C, which, for the case here would be:

$$C = \begin{bmatrix} 1 & -1 \\ 1 & 1 \end{bmatrix}. \quad (4)$$

The retransmission could be any of the following: stream x1 transmitted using [1,1] and stream x2 using [−1,1], i.e. for each of the two shared subcarriers, x1 is transmitted using the same factor (for both subcarriers), and x2 is transmitted using a factor that is the original factor reversed in sign (for both subcarriers), or in other words, the sign-reversed factor; or stream x1 is transmitted using [1,−1] and stream x2 using [−1,−1], i.e. for the first shared subcarrier, x1 is transmitted using the same factor and x2 is transmitted using the sign-reversed factor, and for the second shared subcarrier, x1 transmitted using the sign-reversed factor, and x2 is transmitted using same factor; or stream x1 is transmitted using [−1,1] and stream x2 using [1,1], i.e. for the first shared subcarrier, x1 is transmitted using the sign-reversed factor and x2 is transmitted using the same factor, and for the second shared subcarrier, x1 is transmitted using the same factor and x2 is transmitted using the sign-reversed factor; or stream x1 is transmitted using [−1,−1] and stream x2 using [1,−1], i.e. for each of the shared subcarriers, x1 is transmitted using the sign-reversed factor and x2 is transmitted using same factor. All of these arrangements make the interference between x1 and x2 change sign from the first transmission to the retransmission. Such a sign change does not occur in retransmissions where spreading codes are simply cyclically permuted: retransmission stream x1 transmitted using [1,−1] and stream x2 using [1,1] which would lead to exactly the same interference between x1 and x2.

Thus, if the original transmission is:
x1 on [1, 1] and x2 on [1, −1]

i.e. so that e.g. the factor for the second subcarrier is −1 for data stream 2, then the following retransmissions are permitted since one factor is reversed in sign for each subcarrier:
x1 on [1, 1] and x2 on [−1, 1];
x1 on [−1, −1] and x2 on [1, −1];
x1 on [1, −1] and x2 on [−1, −1]; and
x1 on [−1, 1] and x2 on [1, 1].

However, the other three possibilities of the seven allowing retransmission that maintains orthogonality are not permitted, i.e. the following are not permitted:
x1 on [−1,−1] and x2 on [−1,1];
x1 on [1,−1] and x2 on [1, 1]; and
x1 on [−1, 1] and x2 on [−1,−1].

With the rule according to the invention that one factor is reversed in sign for each subcarrier in the retransmission compared to the original transmission, when there are two subcarriers, this means that exactly two factors are changed in sign. When there are more subcarriers, one sign is changed for each subcarrier. Thus, e.g., in case of four data streams x1, x2, x3 and x4, and a spreading factor of S=4, if the code matrix for the original transmission is:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

indicating that x1 is on [1, 1, 1, 1], and so on, a possible retransmission according to the invention uses the code matrix:

$$\begin{bmatrix} 1 & 1 & -1 & -1 \\ 1 & -1 & -1 & 1 \\ 1 & 1 & 1 & 1 \\ 1 & -1 & 1 & -1 \end{bmatrix},$$

in which pairs of symbols can be found where the sign of one factor for the first subcarrier is changed when compared to the original transmission. Any of the pairs (x1,x3) (x1,x4), (x2, x3), (x3,x4) satisfy the rule that among the retransmitted symbols there is a pair of symbols for which one factor is reversed in sign for each subcarrier, which accords with the more general rule provided by the invention that in a retransmission one factor is reversed in sign for each subcarrier. For the retransmission to be according to the invention, we do not need to change the signs of both x3 and x4. However it can be advantageous to change signs for both x3 and x4 for the first retransmission, and doing so is encompassed by the rule. Thus, the invention encompasses reversing M signs on each subcarrier in case of retransmitting 2M symbol streams sharing N ($\geq$2M) subcarriers. For example, for the following transmission, the indicated retransmissions are according to the invention:
original transmission: x1 x2 x3 x4;
first retransmission: x1 x2 −x3 −x4;
second retransmission: x1 −x2 −x3 x4; and
third retransmission: x1 −x2 x3 −x4.

In some embodiments, it can be advantageous to apply a more restrictive rule, namely that for one of the symbol streams all factors are reversed in sign and for the other of the symbol streams no factors are reversed in sign in the retransmission. Thus, in the above example using two subcarriers, with this more restrictive rule, only the following are permitted retransmissions:
x1 on [1, 1] and x2 on [−1, 1]; and
x1 on [−1,−1] and x2 on [1,−1].

The invention is especially advantageous in some delay-critical applications. As described above, the adaptive retransmission for frequency spreading (ARFS) according to the invention mitigates non-orthogonality (i.e. off-diagonal terms of the cumulative correlation matrix are relatively reduced in size) if the retransmission is within the channel coherence time, and receiver complexity may be reduced. With evolving standards it is likely that the TTI (transmission time interval) or radio frame is to become shorter than the present day standards. For example, in Wideband CDMA (WCDMA) High Speed Downlink and Uplink Packet Access (HSDPA and HSUPA) of present day standards, the TTI is fixed to 2 ms. In the so-called DoCoMo Super3G proposal the TTI is 0.5 ms. Also a TTI size of a WCDMA slot (⅔ ms) is an attractive option for future systems. The delay between retransmissions is typically 6 TTI. Thus with a future-system TTI, two transmissions may be received within 4 ms. This is well within the coherence time of a 30 km/h user at ~2 GHz, which is ~10 ms. Thus in delay-critical services in future systems, it is likely that ARQ gains from time diversity will be compromised. In such a scenario, retransmission according to the invention, which gains from reduced self-interference, may prove especially valuable.

Thus, and now referring to FIGS. 1 and 2, according to the invention, after a transmitting side telecommunications device 11 originally transmits (step 21) to a receiving side telecommunications device 12 a plurality of data streams via OFCDM using multiple subcarriers each conveying all of the data streams according to a code of factors—such as indicated by the matrix C in eq. (4) above—and then receives (step 22) a retransmit request from the receiver, the transmitter retransmits (step 23) with at least one factor reversed in sign for each subcarrier. Both the transmitting side and the receiving side include a transceiver (TRX), a modulator/demodulator (Mod/Demod), and also a coding module for performing source and channel coding according to a coding chain including HARQ (hybrid automatic retransmission request) functionality or other functionality associated with retransmitting all or part of an erroneously received signal in response to a retransmission request by the side receiving the signal.

Referring now also to FIG. 3, a coding chain according to the invention is shown as including a channel coding module 31 and a physical layer HARQ functionality module 32. In a typical embodiment of the invention, in case of a request by the receiving side 12 that the transmitting side 11 retransmit all or part of a signal, the physical layer HARQ functionality module (or corresponding module in case of other functionality for responding to a retransmission request) performs the processing described above and indicated in FIG. 2, in which the transmitting side retransmits all or part of the signal via OFCDM with at least one factor reversed in sign for each subcarrier.

In some embodiments of the invention, the receiving side can ask the transmitting side to retransmit according to the invention, and if not, then according to some default retransmission method. In other embodiments, all retransmissions are per the invention. In case of the receiving side asking the transmitting side to retransmit according to the invention, the receiving side can do so as part of the retransmission request or in a separate communication related to the retransmission request. Also, the transmitting side may continue the retransmissions initiated by methods described above until or if the receiving side does not signal otherwise or a limit for the retransmissions does not prevent it.

Hardware (not expressly indicated) for hosting the indicated functionality is typical of what is found in a wireless communication device, and so typically includes one or more digital signal processors, volatile memory (RAM-appropriate memory) and non-volatile memory (e.g. flash memory, ROM, memory-stick type memory, and so on), one or more microprocessors, one or more antennae for transmitting and one or more antennae for receiving signals, and hardware such as a microphone and speaker pair of input/output devices or a keyboard and video display pair (or both pairs) for inputting and outputting the information being communicated.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements. In particular, the described ARQ method can be combined with any ARQ method known in the art, for example hybrid ARQ with or without incremental redundancy, sequential retransmissions for multicarrier/multistream systems and so on.

What is claimed is:

1. A method, comprising:
    Communicating via a transmitter via wireless communication an original transmission of a signal including two symbol streams each conveyed by at least two subcarriers of a single wideband carrier, wherein each symbol stream is conveyed by each of the at least two subcarriers after each symbol stream is multiplied by a respective factor, the respective factors associated with each symbol stream forming a multicode for the symbol stream and the respective multicodes for the two symbol streams being mutually orthogonal; and
    retransmitting the signal;
    wherein in the retransmission, one factor is reversed in sign for each subcarrier, thereby reducing interference during retransmission.

2. The method as in claim 1, wherein for the retransmission for one of the symbol streams all factors are reversed in sign and for the other of the symbol streams no factors are reversed in sign.

3. The method as in claim 1, wherein among the retransmitted symbols there is a pair of symbols for which one factor is reversed in sign for each subcarrier.

4. The method as in claim 1, wherein in case of retransmitting an even number 2M of symbol streams sharing a plurality N of subcarriers where N is at least 2M, a number M of factors on each subcarrier are reversed in sign.

5. A computer readable medium having stored thereon a computer program that, when executed performs the method according to claim 1.

6. An apparatus, comprising:
    means for providing for wireless communication an original transmission of a signal including two symbol streams each conveyed by at least two subcarriers of a single wideband carrier, wherein each symbol stream is conveyed by each of the at least two subcarriers after each symbol stream is multiplied by a respective factor, the respective factors associated with each symbol stream forming a multicode for the symbol stream and the respective multicodes for the two symbol streams being mutually orthogonal; and
    means for responding to a retransmission request by providing all or part of the original transmission for retransmission, wherein in the retransmission one factor is reversed in sign for each subcarrier, thereby reducing interference during retransmission.

7. A device, comprising:
    a device component, configured for providing a coded signal for wireless communication, wherein the device component comprises
        a channel coding component configured for providing for wireless communication an original transmission of a signal including two symbol streams each conveyed by at least two subcarriers of a single wideband carrier, wherein each symbol stream is conveyed by each of the at least two subcarriers after each symbol stream is multiplied by a respective factor, the respective factors associated with each symbol stream forming a multicode for the symbol stream and the respective multicodes for the two symbol streams being mutually orthogonal; and a hybrid automatic repeat request functionality component configured for responding to a retransmission request by providing all or part of the original transmission for retransmission, wherein in the retransmission one factor is reversed in sign for each subcarrier, thereby reducing interference during retransmission; and a transmitter device configured for transmitting the coded signal and for receiving any retransmission request in respect to the coded signal.

8. A system, comprising:

the device as in claim 7, configured for providing the original transmission of the coded signal, for responding to a request to retransmit the coded signal, and for retransmitting the coded signal; and a receiver device, responsive to the original transmission, configured for providing the request to retransmit the coded signal, and responsive to the retransmitted signal.

9. The apparatus as in claim 7, wherein for the retransmission for one of the symbol streams all factors are reversed in sign and for the other of the symbol streams no factors are reversed in sign.

10. The apparatus as in claim 7, wherein among the retransmitted symbols there is a pair of symbols for which one factor is reversed in sign for each subcarrier.

11. The apparatus as in claim 7, wherein in case of retransmitting an even number 2M of symbol streams sharing a plurality N of subcarriers where N is at least 2M, a number M of factors on each subcarrier are reversed in sign.

12. An apparatus, comprising:

a channel coding component, configured for providing for wireless communication an original transmission of a signal including two symbol streams each conveyed by at least two subcarriers of a single wideband carrier, wherein each symbol stream is conveyed by each of the at least two subcarriers after each symbol stream is multiplied by a respective factor, the respective factors associated with each symbol stream forming a multicode for the symbol stream and the respective multicodes for the two symbol streams being mutually orthogonal; and a hybrid automatic repeat request functionality component, configured for responding to a retransmission request by providing all or part of the original transmission for retransmission, wherein in the retransmission one factor is reversed in sign for each subcarrier, thereby reducing interference during retransmission.

13. The apparatus as in claim 12, wherein for the retransmission for one of the symbol streams all factors are reversed in sign and for the other of the symbol streams no factors are reversed in sign.

14. The apparatus as in claim 12, wherein among the retransmitted symbols there is a pair of symbols for which one factor is reversed in sign for each subcarrier.

15. The apparatus as in claim 12, wherein in case of retransmitting an even number 2M of symbol streams sharing a plurality N of subcarriers where N is at least 2M, a number M of factors on each subcarrier are reversed in sign.

16. A device, comprising:

the apparatus as in claim 12, configured for providing a coded signal for wireless communication; and a transceiver, configured for transmitting the coded signal and for receiving any retransmission request in respect to the coded signal.

* * * * *